(12) United States Patent
Ha et al.

(10) Patent No.: US 12,470,064 B2
(45) Date of Patent: Nov. 11, 2025

(54) SYSTEMS AND METHODS FOR DYNAMIC RATING OF POWER GRIDS

(71) Applicant: General Electric Technology GmbH, Baden (CH)

(72) Inventors: Hengxu Ha, Stafford (GB); Sankara Subramanian Srigopalakrishnamurthi, Stafford (GB); Mitalkumar Kanabar, Markham (CA); Claudia Cosoreanu, Markham (CA); Rajagopal Kommu, Hyderabad (IN)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 517 days.

(21) Appl. No.: 18/045,816

(22) Filed: Oct. 11, 2022

(65) Prior Publication Data

US 2024/0128752 A1    Apr. 18, 2024

(51) Int. Cl.
    *H02J 3/14*    (2006.01)

(52) U.S. Cl.
    CPC ........... *H02J 3/144* (2020.01); *H02J 2300/20* (2020.01)

(58) Field of Classification Search
    CPC ........ H02J 3/144; H02J 2300/20; H02J 3/381; H02J 13/00004; H02J 2203/10; Y02E 60/00
    See application file for complete search history.

(56) References Cited

U.S. PATENT DOCUMENTS

| | | | |
|---|---|---|---|
| 10,447,041 B2 | 10/2019 | Ha et al. | |
| 2007/0206644 A1* | 9/2007 | Bertsch | H02J 13/00016 370/503 |
| 2008/0071482 A1* | 3/2008 | Zweigle | G01R 19/2513 702/62 |
| 2009/0089608 A1* | 4/2009 | Guzman-Casillas | H02H 3/28 713/340 |
| 2009/0240382 A1* | 9/2009 | Mitani | H02J 3/242 703/2 |
| 2012/0179301 A1 | 7/2012 | Aivaliotis et al. | |

(Continued)

OTHER PUBLICATIONS

International Search Report and Written Opinion for PCT/US2023/034722, dated Feb. 1, 2024, 16 pages.

(Continued)

*Primary Examiner* — Christopher E. Everett
(74) *Attorney, Agent, or Firm* — Eversheds Sutherland (US) LLP

(57) ABSTRACT

A system for dynamic rating of a power grid may include a plurality of terminal units, and a controller. The terminal units may detect a voltage phasor and a current phasor at nodes of the power grid. The controller may, based on the voltage phasors and the current phasors of the plurality of nodes, determine a dynamic thermal stability power rating for each line, a dynamic angular stability power rating for each node, and a dynamic voltage stability power rating for each node. The controller may, based on the dynamic thermal stability power rating, the dynamic angular stability power rating, and the dynamic voltage stability power rating, determine a dynamic system rating for the power grid. The controller may control the power grid in response to the dynamic system rating.

20 Claims, 12 Drawing Sheets

(56) References Cited

U.S. PATENT DOCUMENTS

2014/0100702 A1* 4/2014 Schweitzer, III ...... H02H 7/261
　　　　　　　　　　　　　　　　　　　　　700/286

OTHER PUBLICATIONS

Pepiciello, et al.: "A reliable architecture based on Precision Time Protocol for WAMPAC synchronization", 2018 AEIT International Conference, Oct. 2018, pp. 1-5.

Calle, et al.: "Maximum loadability of an isolated system considering steady-state and dynamic constraints", International Journal of Electrical Power & Energy Systems, Jordan Hill, Oxford, GB, vol. 53, Jun. 27, 2013, pp. 774-781.

Maharjan, et al.: "Voltage stability index for online voltage stability assessment", 2015 North American Power Symposium (NAPS), IEEE, Oct. 4, 2015, pp. 1-6.

Giannuzzi, et al.: "Overhead transmission lines dynamic line rating estimation in WAMS environments", 2015 Internation Conference on Clean Electrical Power (ICCEP), IEEE, Jun. 16, 2015, pp. 165-169.

* cited by examiner

SYSTEMS AND METHODS FOR DYNAMIC RATING OF POWER GRIDS

TECHNICAL FIELD

The present disclosure relates to power grids, and in particular, to systems and methods for dynamic rating of power grids.

BACKGROUND

A power grid includes a network of nodes and lines. A power grid may be operated based on a power rating, such that power transmitted is maintained lower than the power rating. Maintaining the power transmission lower than the power rating may avoid node and line faults, for example, associated with line overheating, node voltage collapse, or unstable power swing which results in the collapse of the whole grid due to the system loses frequency synchronization.

However, the use of static power ratings may not account for changing conditions in the grid, because the static power rating is normally made before the grid operation, based on a consideration of the worst operating conditions. For example, the thermal line rating is based on the worst scenario that the line can be operated with, which may result in the real rating power being lower than the actual rating capacity. Using lower power than the actual capacity may result in congestion of power transmission, leading to the power rejection of renewable sources, such as windfarms.

A need remains for dynamic rating of power grids that accounts for varying conditions of the power grid.

SUMMARY

The present disclosure relates to power grids, and in particular, to systems and methods for dynamic rating of power grids. The dynamic system rating may include a dynamic line thermal rating (to avoid overheat), a dynamic angular stability power rating (to avoid losing angular stability), and a dynamic voltage stability power rating (to avoid voltage collapse).

In embodiments, the present disclosure describes a system for dynamic rating of a power grid. The power grid may include a network of a plurality of nodes coupled by a plurality of lines. The system may include a plurality of terminal units, and a controller. Each terminal unit of the plurality of terminal units may be configured to detect a voltage phasor and a current phasor of a respective node of the plurality of nodes and generate signals indicative of the voltage phasor and the current phasor. The controller may be configured to receive signals from the plurality of terminal units indicative of the voltage phasors and the current phasors of the plurality of nodes. The controller may be further configured to determine, based on the voltage phasors and the current phasors of the plurality of nodes, a dynamic thermal stability power rating for each line of the plurality of lines. The controller may be further configured to determine, based on the voltage phasors and the current phasors of the plurality of nodes, a dynamic angular stability power rating for each node of the plurality of nodes. The controller may be further configured to determine, based on the voltage phasors and the current phasors of the plurality of nodes, a dynamic voltage stability power rating for each node of the plurality of nodes. The controller may be further configured to determine, based on the dynamic thermal stability power rating, the dynamic angular stability power rating, and the dynamic voltage stability power rating, a dynamic system rating for the power grid. The controller may be further configured to control (for example, optimally control) the power grid in response to the dynamic system rating.

In embodiments, the present disclosure describes a method for dynamic rating of a power grid including a network of a plurality of nodes coupled by a plurality of lines. The method may include sending, to a controller, signals from a plurality of terminal units indicative of voltage phasors and current phasors at each node of the plurality of nodes. The method may further include determining, by the controller, based on the voltage phasors and the current phasors of the plurality of nodes, a dynamic thermal stability power rating for each line of the plurality of lines. The method may further include determining, by the controller, based on the voltage phasors and the current phasors of the plurality of nodes, a dynamic angular stability power rating for each node of the plurality of nodes. The method may further include determining, by the controller, based on the voltage phasors and the current phasors of the plurality of nodes, a dynamic voltage stability power rating for each node of the plurality of nodes. The method may further include determining, by the controller, based on the dynamic thermal stability power rating, the dynamic angular stability power rating, and the dynamic voltage stability power rating, a dynamic system rating for the power grid. The method may further include controlling, by the controller, the power grid in response to the dynamic system rating.

Additional systems, methods, apparatus, features, and aspects can be realized through the techniques of various embodiments of the disclosure. Other embodiments and aspects of the disclosure are described in detail herein and are considered a part of the claimed subject matter. Other features can be understood and will become apparent with reference to the description and to the drawings.

BRIEF DESCRIPTION OF THE DRAWINGS

Having thus described the disclosure in general terms, reference will now be made to the accompanying drawings, which are not necessarily drawn to scale.

Figure 1:
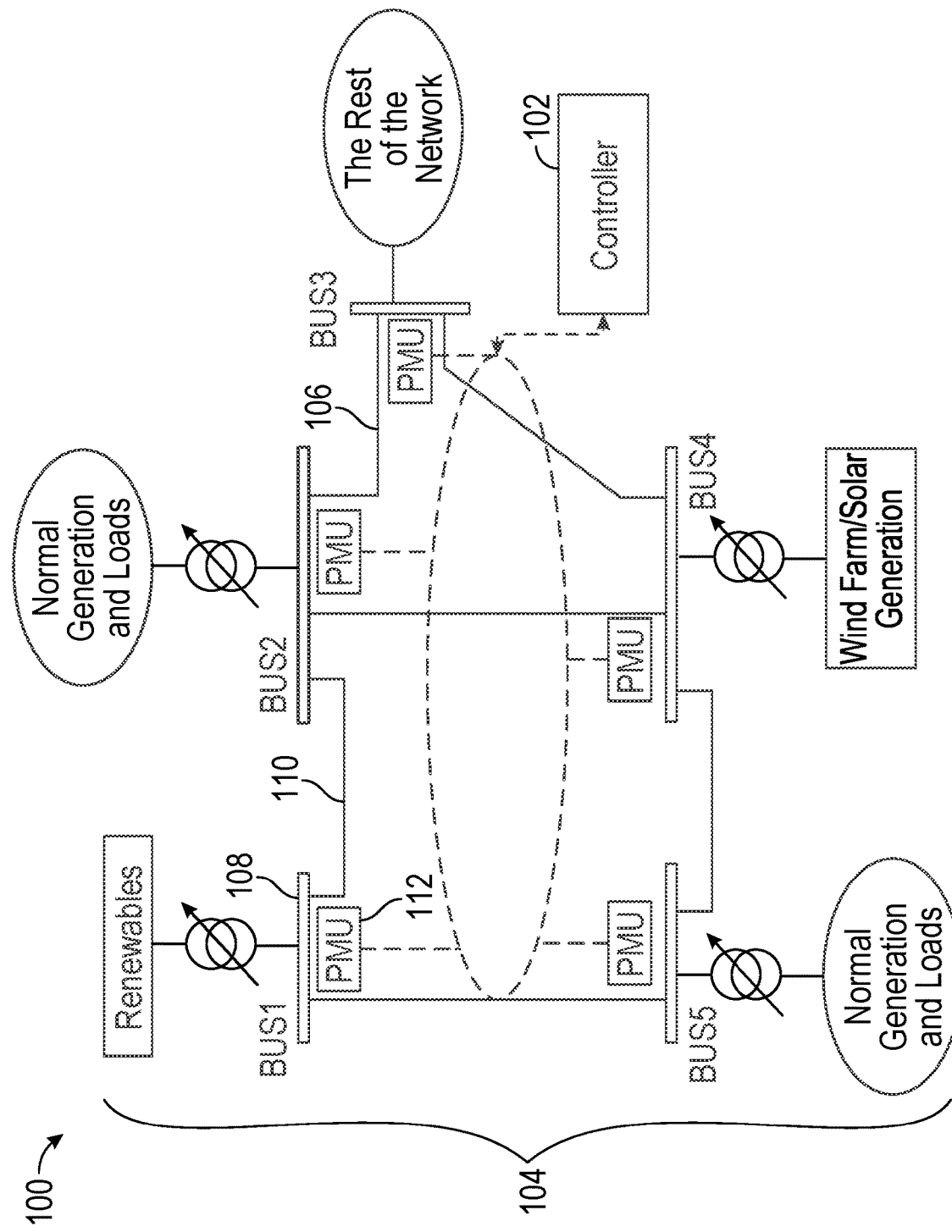

FIG. 1 is a block diagram showing a system including a controller for controlling a power grid including a network of nodes and lines.

Figure 2:
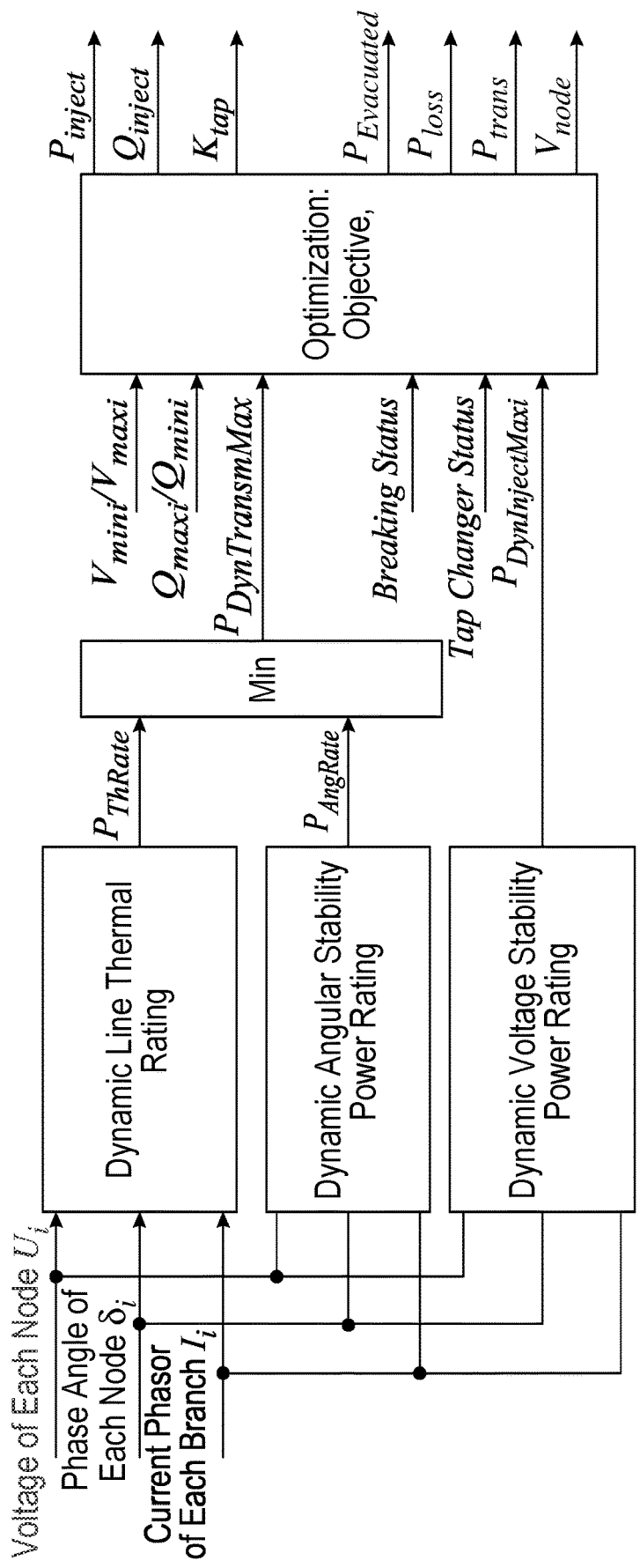

FIG. 2 is a block diagram showing a scheme for determining a dynamic system rating of the power grid of FIG. 1.

Figure 3:
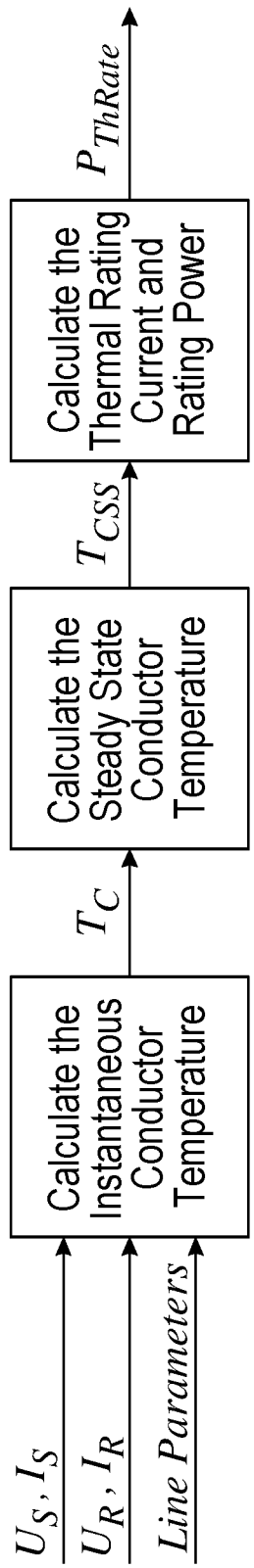

FIG. 3 is a block diagram showing a scheme for determining a dynamic thermal stability power rating of a line.

Figure 4:
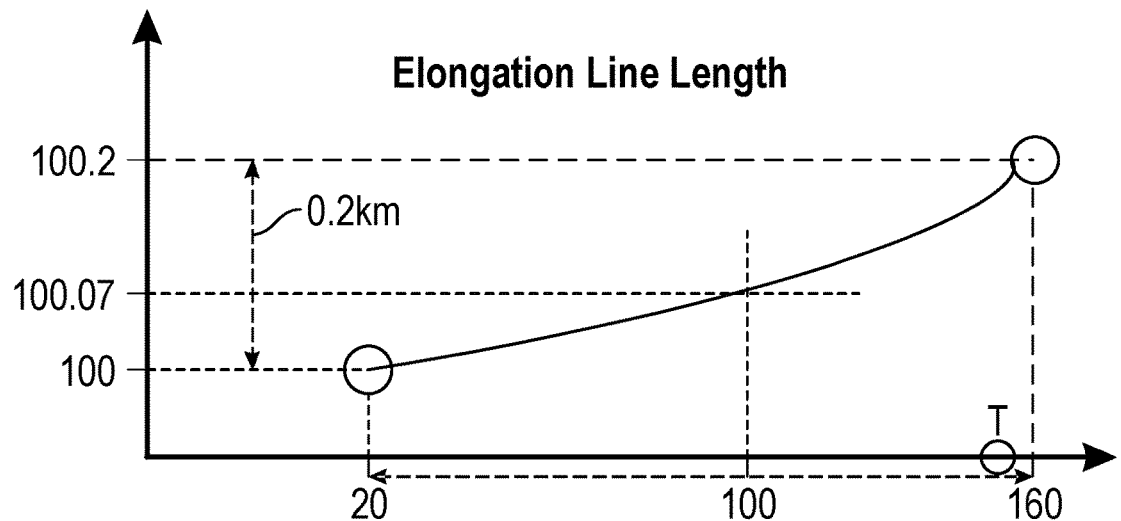

FIG. 4 is a chart showing an example of a numerical relationship between a length of a line and an instantaneous temperature of the line based on elongation coefficients.

Figure 5:
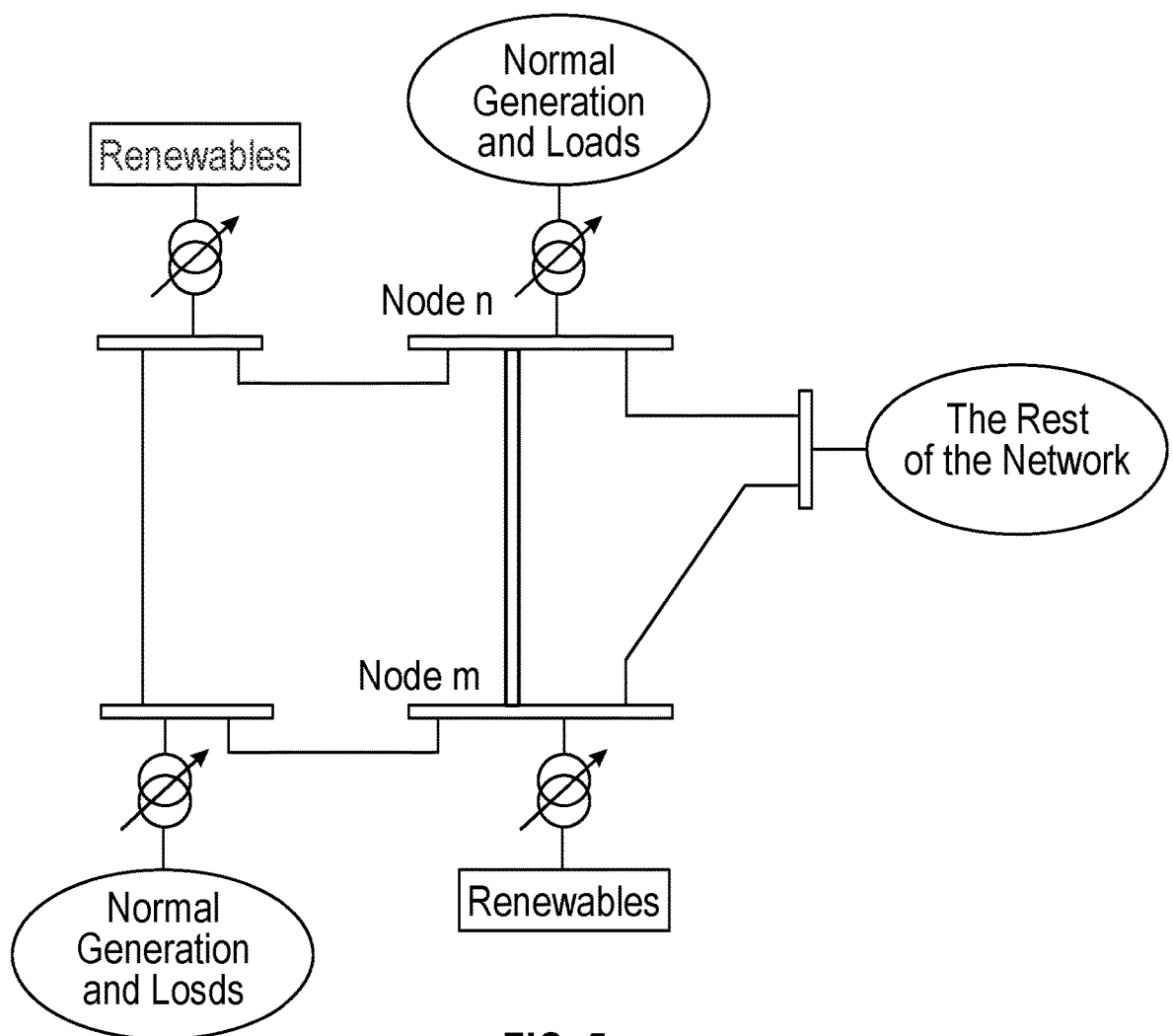

FIG. 5 is a block diagram showing a line between nodes 'm' and 'n' of the power grid of FIG. 1.

Figure 6:
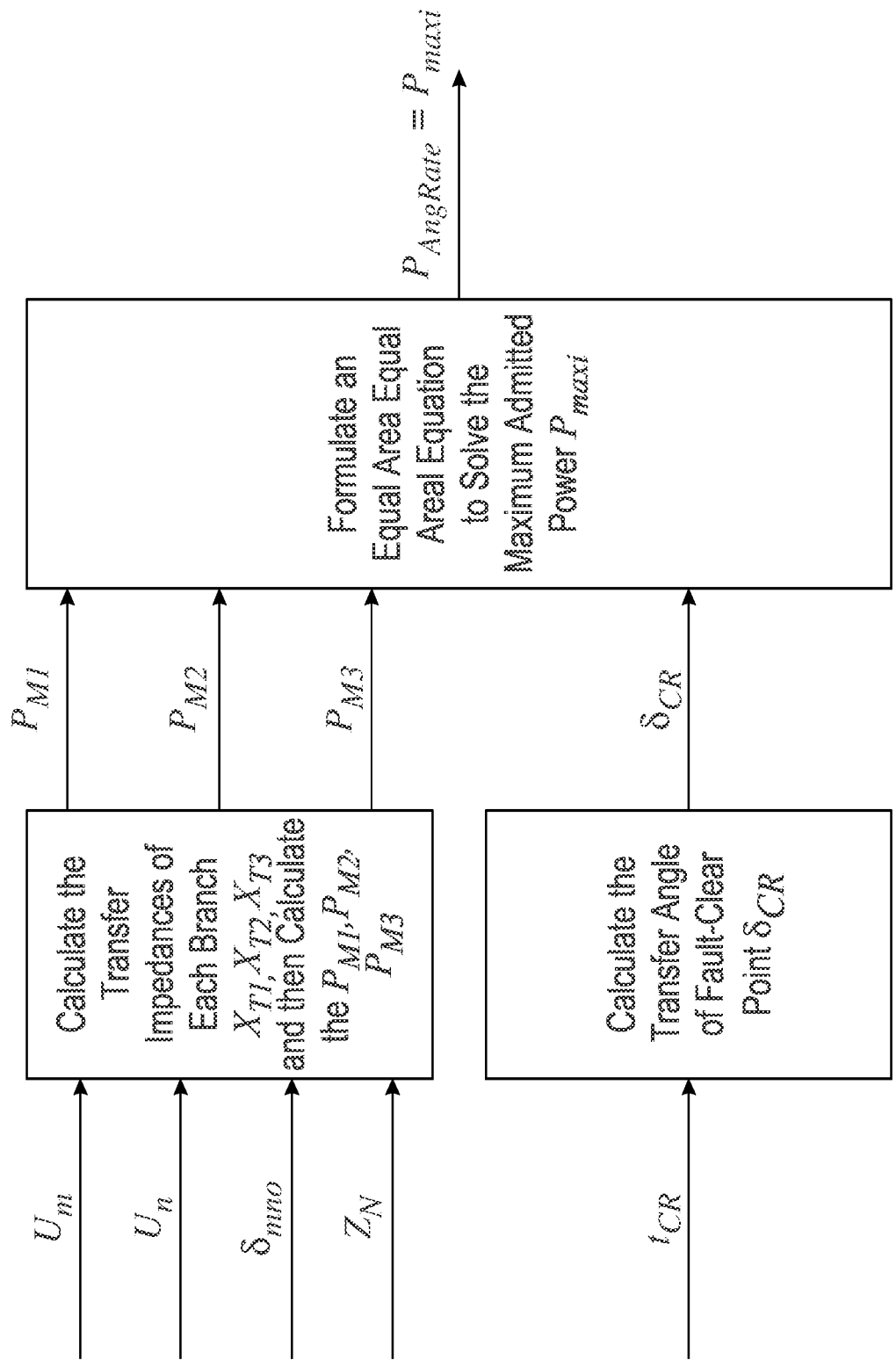

FIG. 6 is a block diagram showing a scheme for determining a dynamic angular stability power rating for the line of FIG. 5.

Figure 7:
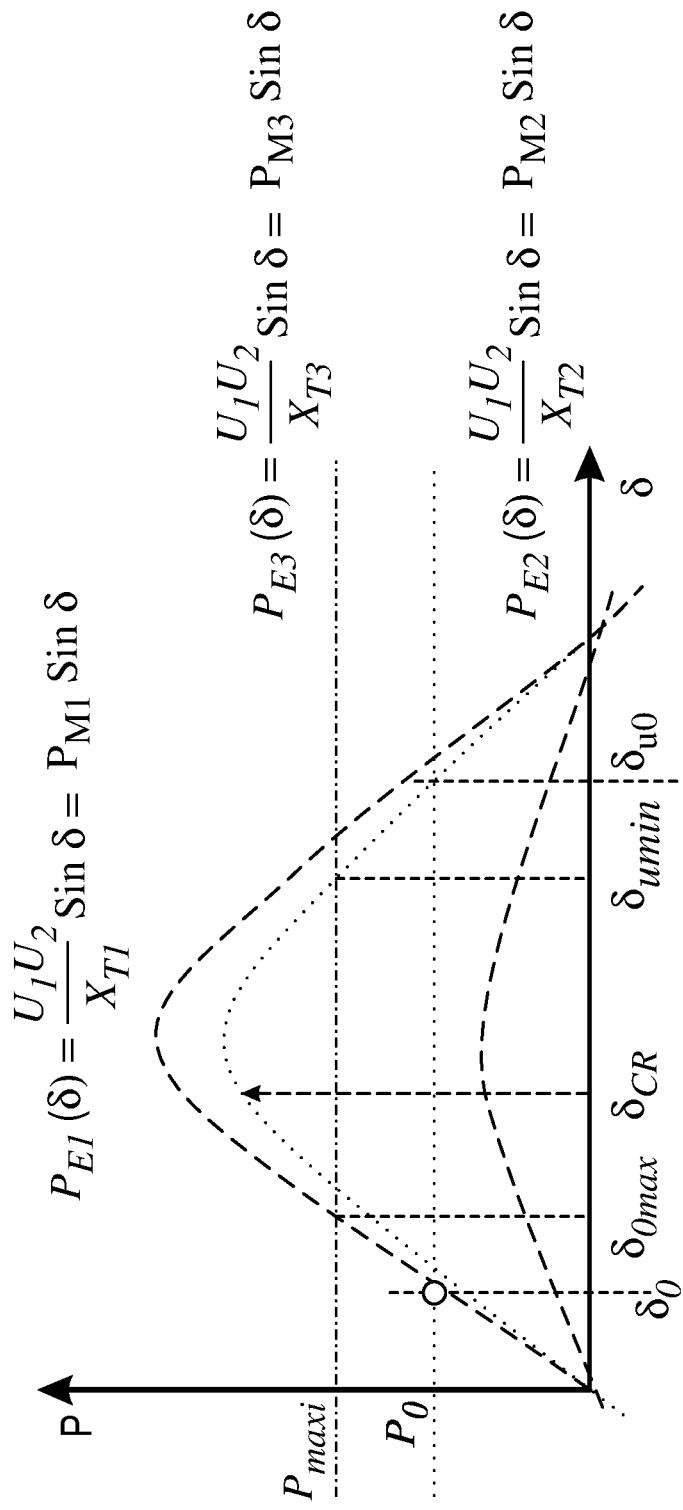

FIG. 7 is a chart showing the use of equal area criterion for determining the dynamic angular stability rating using the scheme of FIG. 6.

Figure 8:
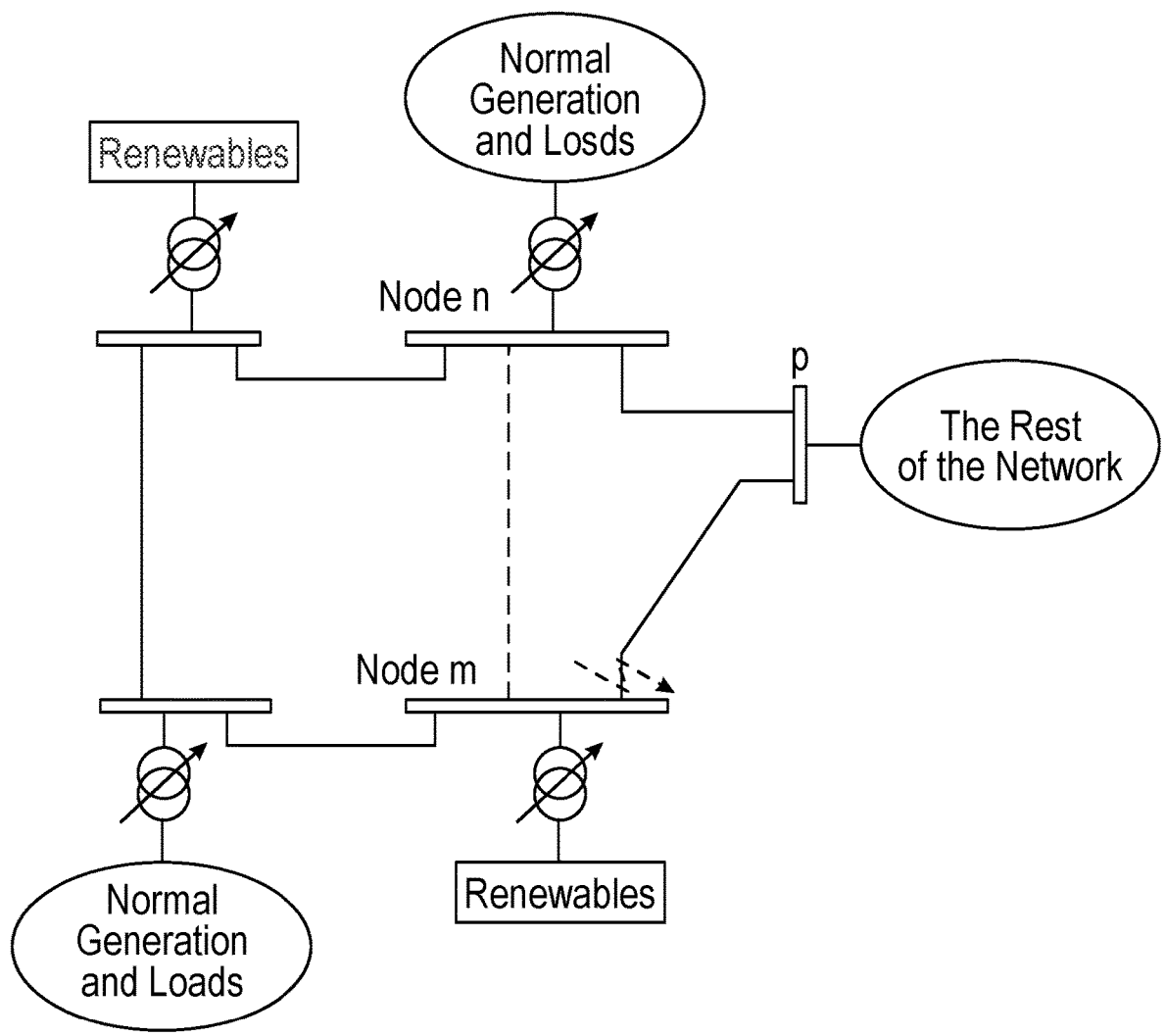

FIG. 8 is a block diagram showing a fault assumed on a line 'mp' adjacent node 'm' of the power grid of FIG. 1.

Figure 9:
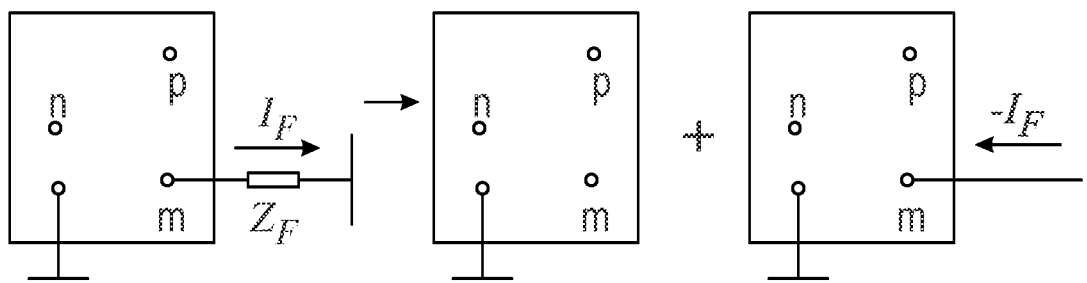

FIG. 9 is a block diagram showing a scheme for determining an impedance matrix associated with the fault of FIG. 8.

Figure 10:
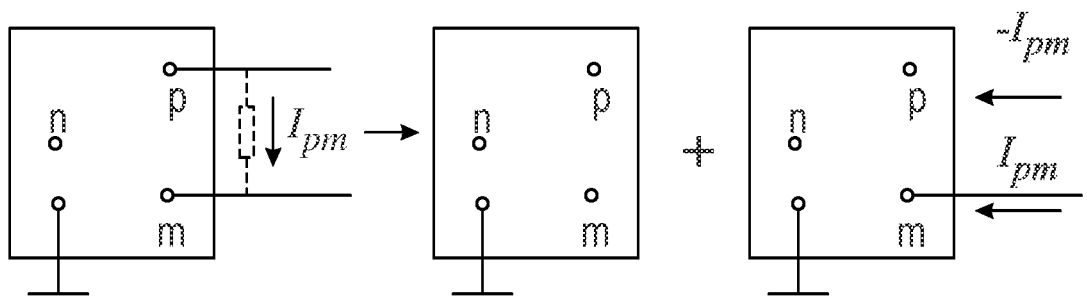

FIG. 10 is a block diagram showing a scheme for determining an impedance matrix after the fault of FIG. 8 is cleared.

Figure 11:
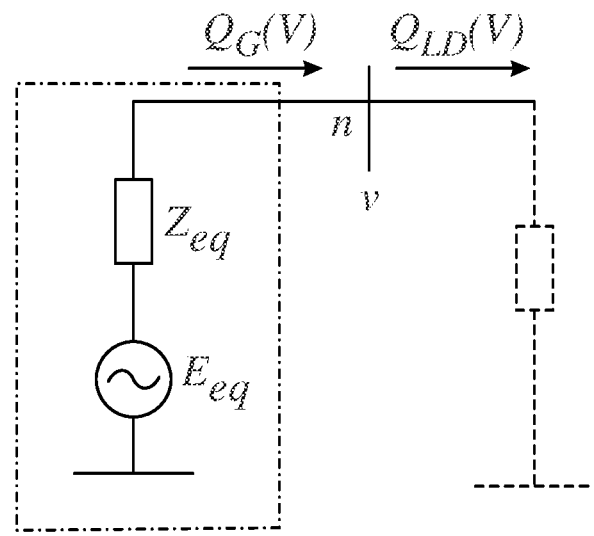

FIG. 11 is a block diagram showing an equivalent Thevenin's circuit for a node 'n' of the power grid of FIG. 1 for determining a dynamic voltage stability power rating.

Figure 12:
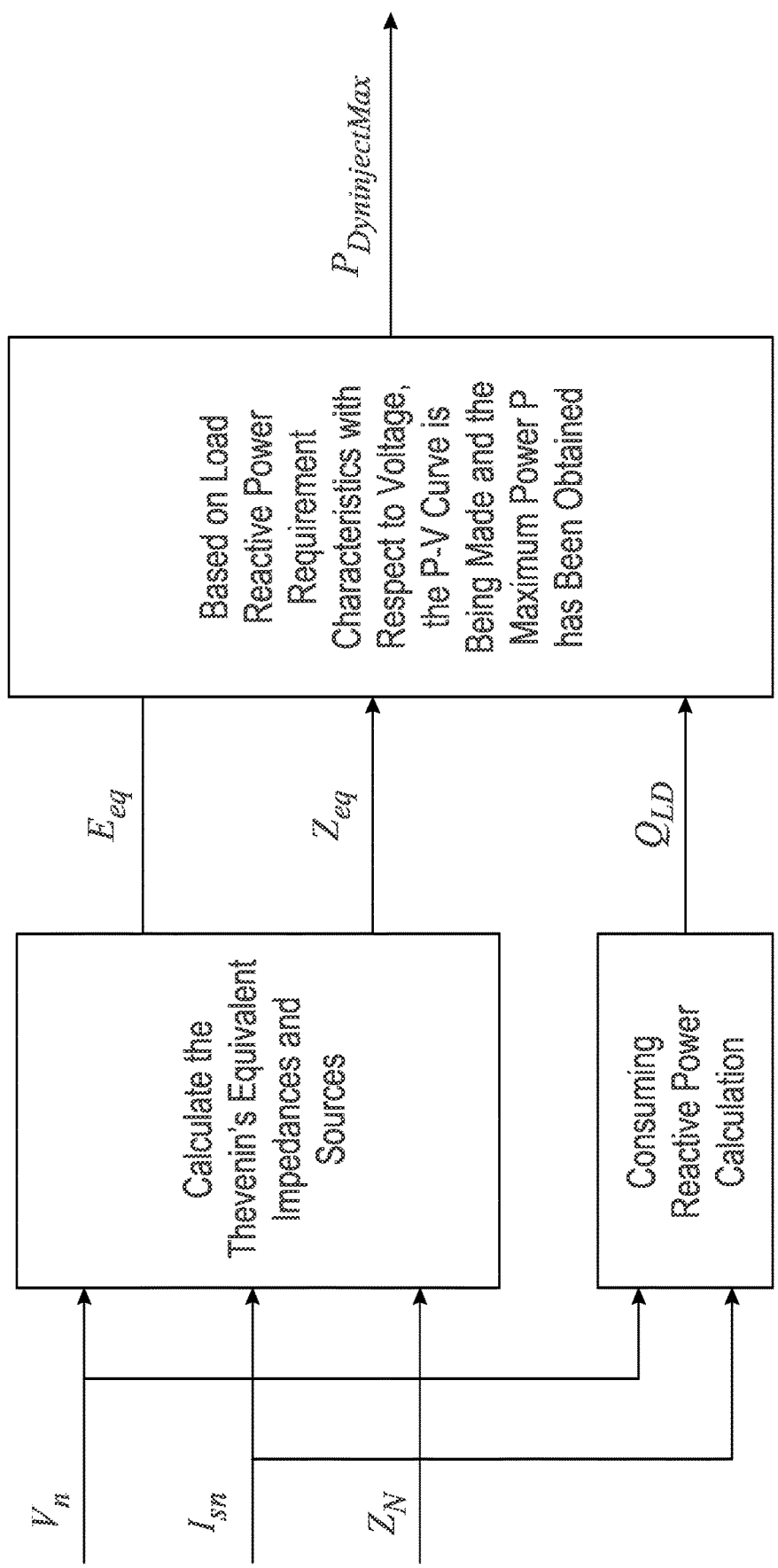

FIG. 12 is a block diagram showing a scheme for determining a dynamic voltage stability power rating based on the Thevenin's circuit of FIG. 11.

Figure 13:
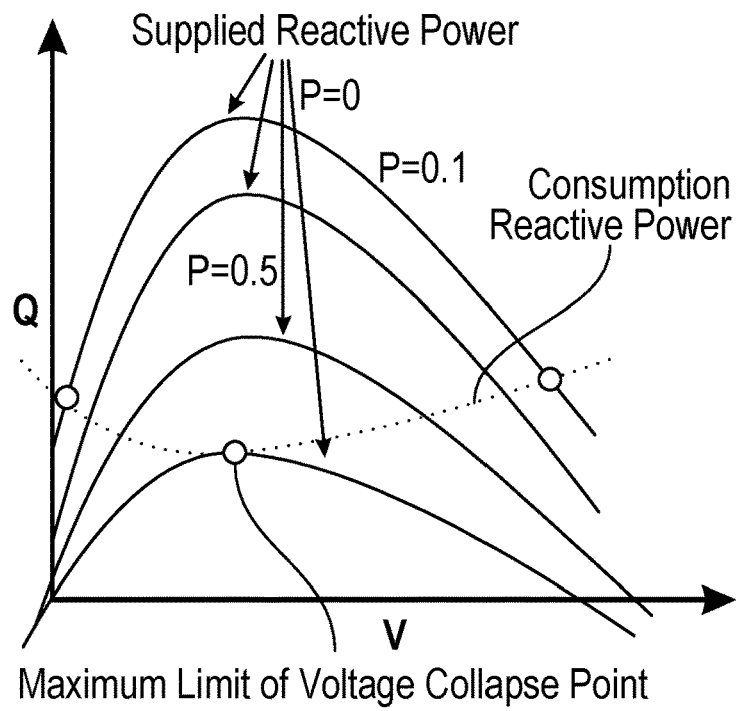

FIG. 13 is a chart showing the crossing of example reactive power curves with a consumption reactive power curve for determining maximum active power.

Figure 14:
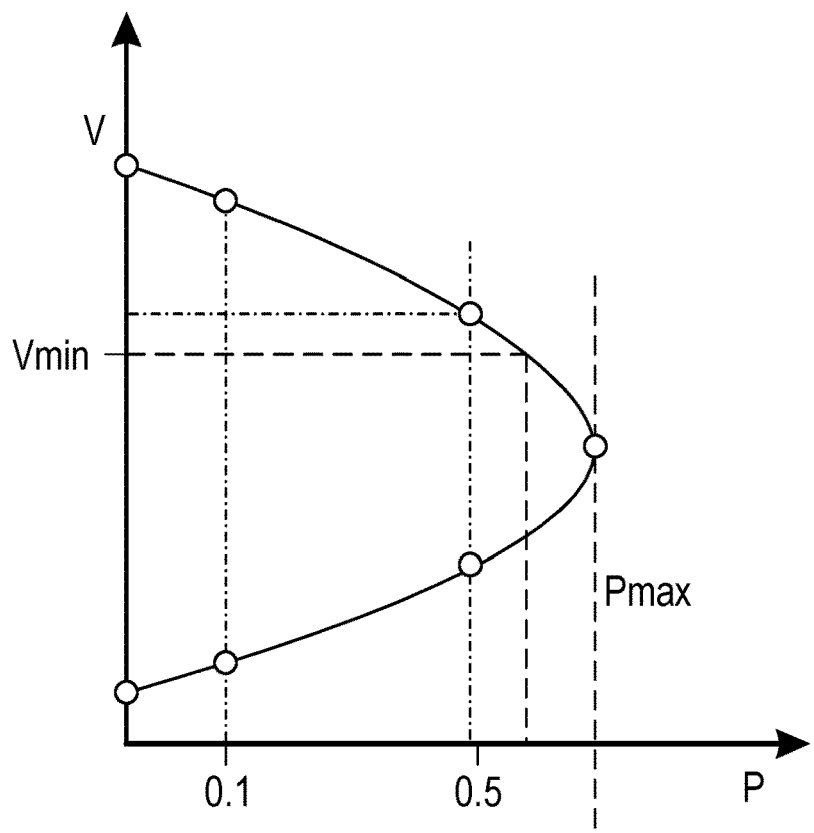

FIG. 14 is a chart showing the relationship between active power and voltage, and the maximum active power at marginal point of voltage stability.

Figure 15:
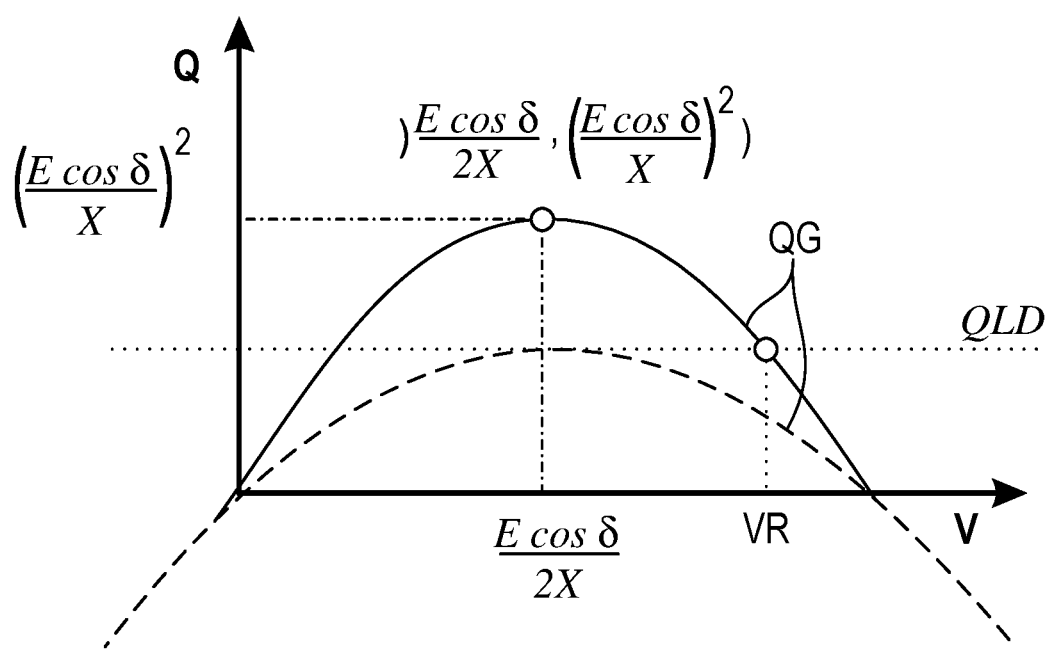

FIG. 15 is a chart showing the determination of maximum active power based on reactive power curves.

Figure 16:
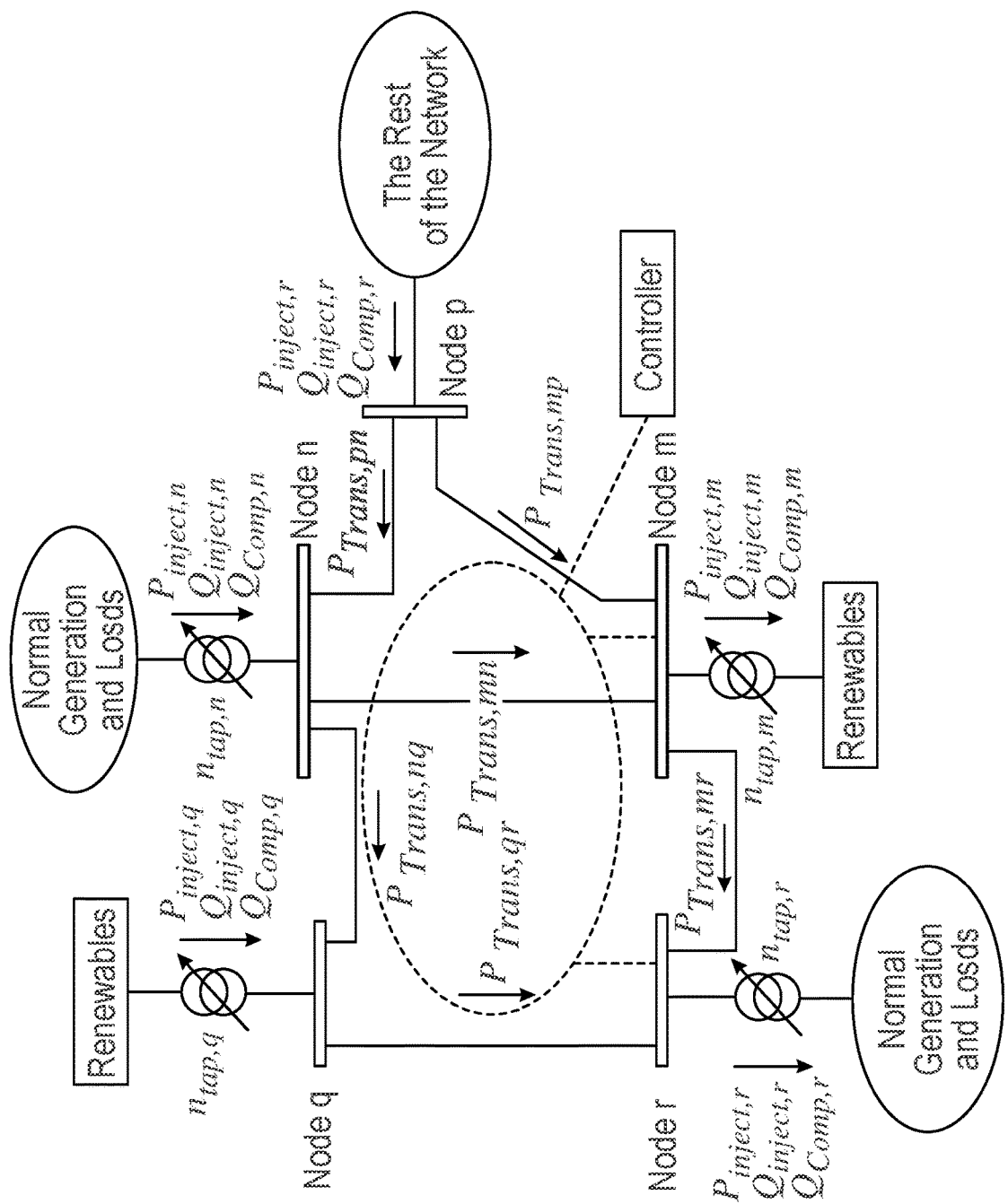

FIG. 16 is a block diagram showing the controller of FIG. 1 controlling the power grid to increase power transmission from a renewable energy source while reducing power transmission loss.

Embodiments of the disclosure are described more fully below with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the present disclosure to those skilled in the art. Like numbers refer to like, but not necessarily the same or identical, elements throughout.

The following embodiments are described in sufficient detail to enable at least those skilled in the art to understand and use the disclosure. It is to be understood that other embodiments would be evident based on the present disclosure and that process, mechanical, material, dimensional, process equipment, and parametric changes may be made without departing from the scope of the present disclosure.

In the following description, numerous specific details are given to provide a thorough understanding of various embodiments of the present disclosure. However, it will be apparent that the present disclosure may be practiced without these specific details. In order to avoid obscuring the present disclosure, some well-known system configurations and process steps may not be disclosed in full detail. Likewise, the drawings showing embodiments of the disclosure are semi-diagrammatic and not to scale and, particularly, some of the dimensions are for the clarity of presentation and may be exaggerated in the drawings. In addition, where multiple embodiments are disclosed and described as having some features in common, for clarity and ease of illustration, description, and comprehension thereof, similar and like features will ordinarily be described with like reference numerals even if the features are not identical.

DETAILED DESCRIPTION

The present disclosure relates to power grids, and in particular, to systems and methods for dynamic rating of power grids. A power grid may include a network of nodes and lines, with nodes representing power sources or sinks, and lines representing connections between the nodes. To avoid failure, losses, or fatigue, one or more elements of the power grid may be operated based on a rating, or a predetermined maximum power level associated with a node or a line. Certain ratings for power grids are static, for example, being based generally on parameters associated with components of the grids, but which may not account for changes in the grid. Static ratings for power grids may not account for changing operational conditions, such as changes in power from renewable sources, the consumption of reactive power from load, the changing of system topologies due to the breaking of lines, the change of the ambient conditions, or other conditions. Operating a power grid based on a static rating may result in drawing or transmitting lower power than the actual capacity of the power grid. For example, if the power grid is controlled in compliance with static ratings, the power drawn from a node associated with a renewable source (such as solar power, wind power, or other sources) may be much lower than the maximum capacity of the source, which may result in the unnecessary power being rejected from the renewable resources.

In order to increase the power drawn from renewables, systems and methods according to the present disclosure provide a dynamic system rating for the grid. Operating or controlling the power grid based on a dynamic system rating may transfer more renewable energy (for example, compared to power transferred based on a static rating of transmission power capacity), and dynamically varying adaptive to the operational condition of the power grid, evacuating more power from renewable sources. Certain dynamic ratings may only account for a limited number of parameters, for example, parameters associated with a line, but not account for parameters associated with nodes or faults. Certain dynamic ratings may require sensing ambient environmental conditions, for example, temperature, wind speed, atmospheric pressure, and the like. Dynamic system ratings according to the present disclosure may not need sensing or determining of environmental conditions, and may account for parameters in addition to those only associated with lines.

In embodiments, the present disclosure describes a system for dynamic rating of a power grid. The power grid may include a network of a nodes coupled by lines. The system may include terminal units, and a controller. Each terminal unit of terminal units may be configured to detect a voltage phasor and a current phasor of a respective node of the nodes and generate signals indicative of the voltage phasor and the current phasor. The controller may be configured to receive signals from terminal units indicative of the voltage phasors and the current phasors of nodes. The controller may be further configured to determine, based on the voltage phasors and the current phasors of nodes, a dynamic thermal stability power rating for each line of the lines. The controller may be further configured to determine, based on the voltage phasors and the current phasors of nodes, a dynamic angular stability power rating. The controller may be further configured to determine, based on the voltage phasors and the current phasors of nodes, a dynamic voltage stability power rating for each node of the nodes. The controller may be further configured to determine, based on the dynamic thermal stability power rating, the dynamic angular stability power rating, and the dynamic voltage stability power rating, a dynamic system rating for the power grid. The controller may be further configured to control the power grid in response to the dynamic system rating. In embodiments, the controller may be configured to optimally control the power grid. Thus, dynamic system ratings according to the present disclosure may account for parameters associated with different components of the network, and without requiring sensing environmental or ambient conditions.

Systems and methods according to the present disclosure may allow drawing more power from renewable sources, while accounting for thermal, angular, and voltage stabilities. Further, the overall power flow may be increased or optimized, which may reduce or minimize power transmission losses. Maximum rating for transmission of powers (or currents) based on the thermal, angular and voltage stabilities may be calculated substantially in real-time or on-line, based on dynamically changing operational conditions of the power grid. Based on the determined dynamic rating power, the power flow and generation power distribution may be re-arranged or reconfigured for increasing power drawn from renewable sources, while reducing power transmission loss.

FIG. 1 is a block diagram showing a system 100 including a controller 102 for controlling a power grid 104 including a network 106 of nodes 108 and lines 110. For example, the network 106 may include nodes 108 connected by lines 110. A node of the nodes 108 may be connected to one or more other nodes of nodes 108 by respective lines of lines 110. Thus, nodes 108 may be coupled by lines 110. In embodiments, at least one node of the nodes 108 is associated with a renewable power source. For example, the renewable power source may include solar energy, wind energy, or a stored source of energy, for example, an electric vehicle battery connected to a charging node. In embodiments, the power grid 104 may include two or more renewable sources. For example, in FIG. 1, "Bus 1" and "Bus 4" provide connections with renewable sources.

The system 100 may include terminal units 112. Each terminal unit of terminal units 112 may be configured to detect a voltage phasor and a current phasor of a respective node of the nodes 108 and generate signals indicative of the voltage phasor and the current phasor. In embodiments, at least one terminal unit of terminal units 112 may include a synchronous phasor measurement unit (PMU), a remote terminal unit (RTU), a feeder terminal unit (FTU), a zonal client, or a zonal agent. The PMU may be a synchronous PMU. In embodiments, each terminal unit of terminal units includes a PMU. The terminal units 112 may measure the voltage phasors (magnitude and phase) of each bus or node, and current phasors (magnitude and phases) flowing from each bus or node. Synchronous PMUs may synchronously measure the voltage phasors and current phasors. Ultimately, terminal units 112 may generate signals indicative of the phasors, and transmit the signals. In embodiments, the signals are received by the controller 102.

The controller 102 may include a local computer, a remote server, processing circuitry, a central unit, or any device including a processor, memory, storage, and a communication module. The controller 102 may be wired or wireless. In embodiments, the controller includes a power gateway or a server. For example, the power gateway may include a GE Power Gateway (General Electric, Boston, MA). The controller 102 may be configured to sense one or more parameters associated with the power grid 104, and control or regulate the operation of the power grid 104, for example, by controlling one or more components of the power grid 104. In embodiments, the controller 102 is configured to regulate, connect, or disconnect one or more of nodes 108 or lines 110 to control or divert the flow of power transmitted through the network 106.

In embodiments, the controller 102 is configured to receive signals from terminal units 112 indicative of the voltage phasors and the current phasors of nodes 108. The current phasors may be associated with respective lines of lines 106 coupled to a respective node of the nodes 108.

FIG. 2 is a block diagram showing a scheme for determining a dynamic system rating of the power grid 104 of FIG. 1.

The controller 102 may be configured to implement the scheme shown in FIG. 2. For example, the controller 102 may be configured to determine different stability ratings, such as a dynamic line thermal stability power rating, a dynamic angular stability power rating, and a dynamic voltage stability rating.

The controller 102 may determine the synchronous voltage and current phasors based on the signals received from the terminal 112. The controller 102 may, based on the corresponding voltage and current phasors ($I_i$) of two terminals of each line, determine the dynamic line thermal power rating of each line ($P_{ThRate}$) The controller 102 may, based on the voltage phasor ($U_i$) and its phase angle ($\delta_i$) of the two terminals of each line, determine the dynamic power rating for angular stability margin is calculated ($P_{AngRate}$) The controller 102 may, based on the voltage phasor of each bus junction and the currents of all outgoing lines, determine the dynamic rating power of the injection power to this junction is calculated ($P_{InjectMaxi}$) Based on these dynamic power restraints of each line and each junction, the controller may determine a flow control strategy to re-arrange the power flow distribution for increasing (or maximizing) the draw of renewable power and reducing (or minimizing) the overall grid transmission loss. For example, the controller may determine a tap changer position of transformers and compensated reactive power of each bus junction.

FIG. 3 is a block diagram showing a scheme for determining a dynamic thermal stability power rating of a line of the power grid of FIG. 1. The controller 102 may be further configured to determine, based on the voltage phasors and the current phasors of nodes, a dynamic thermal stability power rating for each line of the lines 110. The controller 102 may determine an instantaneous conductor temperature ($T_C$) based on the measured voltage and current phasors of two terminals of each branch/link of the grid. For example, the controller 102 may determine a real conductor (line) length by using EQUATION 1.

$$\begin{bmatrix} V_R \\ I_R \end{bmatrix} = \begin{bmatrix} A(l) & B(l) \\ C(l) & D(l) \end{bmatrix} \begin{bmatrix} V_S \\ I_S \end{bmatrix} \quad \text{(Equation 1)}$$

In EQUATION 1:

$A(l) = \cosh(\gamma l)$;

$B(l) = -Z_C \sinh(\gamma l)$;

$C(l) = -\dfrac{\sinh(\gamma l)}{Z_C}$;

$D(l) = \cosh(\gamma l)$;

and, $\gamma = \sqrt{z_1 y_1}$, $Z_C = \sqrt{z_1/y_1}$, $z_1$, $y_1$ are parameters of the line, which are respectively the series impedance per unit length (Ohm/km, or Ohm/mi) and shunt admittance per unit (S/km, or S/mi).

These may be obtained from memory or input by a user.

Subsequently, the real length of the conductor can be mapped to the real-time instantaneous temperature Tc, by solving EQUATION 2.

$$l = l_{0,T=20} + \rho_1(T_c - T_{20}) + \rho_2(T_c - T_{20})^2 \quad \text{(Equation 2)}$$

In EQUATION 2, $\rho_1$ and $\rho_2$ are elongation coefficients of the line, which can be obtained by the line type and its parameters.

FIG. 4 is a chart showing an example of a numerical relationship between a length of a line and an instantaneous temperature of the line based on elongation coefficients.

The controller 102 may further calculate a steady state conductor temperature ($T_{CSS}$). For example, the controller 102 may continuously calculate a number of samples, for example, at least 3 samples, of instantaneous temperature (Tc) with time interval Ts. Ts may be any suitable interval, for example, 1 s, 5 s, or 10 s, as $T_C(n-2)$, $T_C(n-1)$, and $T_C(n)$. The controller 102 may further determine the time constant of the thermal dynamic process, $\alpha$, by using EQUATION 3.

$$\alpha = \frac{2}{T_S} \frac{T_C(n) - 2T_C(n-1) + T_C(n-2)}{T_C(n) - T_C(n-2)} \quad \text{(Equation 3)}$$

The controller 102 may further calculate the steady state conductor temperature using EQUATION 4.

$$T_{CSS} = \frac{1}{\alpha} \frac{T_C(n) - T_C(n-1)}{T_S} + \frac{T_C(n) + T_C(n-1)}{2} \quad \text{(Equation 4)}$$

The controller 102 may further calculate the rating power of thermal stability, ($P_{ThRate}$) For example, the controller 102 may continuously calculate at least two steady state conductor temperatures, $T_{CSS}(n)$ and $T_{CSS}(n-1)$, accompanied with the measured corresponding currents, I(n) and I(n-1). The controller 102 may determine the maximum rating current by using EQUATION 5.

$$I_{max}(n) = \sqrt{I^2(n) + \frac{I^2(n) - I^2(n-1)}{T_{css}(n) - T_{css}(n-1)}(T_{max} - T_{css}(n))} \quad \text{(Equation 5)}$$

In EQUATION 5, $T_{max}$ is the maximum conductor temperature that the line can bear. The controller 102 may determine a maximum dynamic rating power of thermal stability using EQUATION 6.

$$P_{ThRate} = U_S I_{Max} \quad \text{(Equation 6)}$$

In embodiments, the controller 102 is configured to determine the dynamic thermal stability power rating for each line of the lines 110 without assessing environmental parameters. For example, the controller 102 may not sense or otherwise assess air temperature, air pressure, or air velocity, or other environmental parameters. In other embodiments, the controller 102 may be configured to determine the dynamic thermal stability power rating based on at least one environmental parameter.

The controller may be further configured to determine, based on the voltage phasors and the current phasors of nodes 108, a dynamic angular stability power rating for each node of the nodes 108.

FIG. 5 is a block diagram showing a line between nodes 'm' and 'n' of the power grid of FIG. 1. FIG. 6 is a block diagram showing a scheme for determining a dynamic angular stability power rating for a line between nodes 'm' and 'n' of FIG. 5.

Controller 102 may determine the electromagnetic powers transmitted in each line by using the measured voltages and angle difference between the two terminals and the impedance matrix of the network, at the following scenarios:

scenario 1, the power of the normal status, $P_{M1}$;

scenario 2, the power of faulty status (assumed fault applied onto the next lines), $P_{M2}$; and scenario 3, the power of the status after fault cleared, $P_{M3}$.

Controller 102 may further determine the angle of the instance that the fault was cleared ($\delta_{CR}$). Controller 102 may further calculate the dynamic rating power for angular stability, based on equal area criterion. FIG. 7 is a chart showing the use of equal area criterion for determining the dynamic angular stability rating using the scheme of FIG. 6.

Under scenario 1, the controller 102 determines the power at normal status. For example, the controller 102 may determine the transfer impedance from the impedance matrix ZN. If the line terminal (node) number is 'm' and 'n' respectively, the transfer impedance, noted as Zmn, is the element of mth row and nth column of impedance matrix ZN. Then, EQUATION 7 may be used to determine the power of the normal status, $P_{M1}$.

$$P_{M1} = \frac{U_m U_n}{X_{mn}} \quad \text{(Equation 7)}$$

Under scenario 2, the controller 102 determines the power at faulty status. FIG. 8 is a block diagram showing a fault assumed on a line 'mp' adjacent node 'm' of the power grid of FIG. 1. Assuming a fault at terminal 'm' of another line mp, this equals an impedance ZF, connected onto bus m, where ZF is fault additional impedance. For example, if the single-phase-to-ground fault is considered, the fault additional impedance is the sum of negative sequence and zero-sequence equivalent impedance at bus m, that is, $Z_F = Z_{mm2} + Z_{mm0}$. If the phase-to-phase fault is considered, the additional impedance is $Z_F = Z_{mm2}$.

The controller 102 may add this additional impedance $Z_F$ into the impedance matrix $Z_N$, to formulate a new impedance matrix $Z_{NF}$, as shown in FIG. 9. FIG. 9 is a block diagram showing a scheme for determining an impedance matrix associated with the fault of FIG. 8. The controller 102 may determine the renewed element of impedance matrix $Z_{NF}$ can be obtained by EQUATION 8.

$$Z_{NF}(i, j) = Z_N(i, j) - \frac{Z_N(i, m) Z_N(m, j)}{Z_N(m, m) + Z_F} \quad \text{(Equation 8)}$$

The transfer impedance of mn at faulty status is the element of mth row and nth column of the impedance matrix $Z_{NF}$: $Z_{mnF} = Z_{NF}(m, n)$. The controller 102 may determine the voltages of bus m and n at fault status. The fault current may be determined using EQUATION 8.

$$I_F = \frac{U_m}{Z_{mm} + Z_F} \quad \text{(Equation 9)}$$

In EQUATION 9, $Z_{mm}$ is the element of mth row mth column of original impedance matrix $Z_N$. The voltage phasor of bus m and n at faulty status may be determined using EQUATIONS 10 and 11. (based on superposition, FIG. 9).

$$U_{mF} = U_m - Z_{mm}I_F \quad \text{(Equation 10)}$$

$$U_{nF} = U_n - Z_{mn}I_F \quad \text{(Equation 11)}$$

The controller 102 may determine the electro-magnetic power $P_{M2}$ at faulty status using EQUATION 12.

$$P_{M2} = \frac{U_{mF}U_{nF}}{X_{mnF}} \quad \text{(Equation 12)}$$

Under scenario 3, the controller 102 may determine the power after fault clearance. After a predetermined time interval, for example, 50 ms, or 100 ms, or 200 ms, the fault on the line mp will be cleared. That is, the link branch mp will be open. This network where link branch mp is opened can be regarded as adding an impedance, which is negative impedance of line mp, between mp, as shown in FIG. 10. FIG. 10 is a block diagram showing a scheme for determining an impedance matrix after the fault of FIG. 8 is cleared.

In embodiments, the controller 102 is configured to determine the dynamic angular stability power rating by simulating applying a fault and clearing the fault at each node of the nodes 108.

For determining the response of the power grid to a fault and clearing of the fault, the controller 102 may determine the transfer impedance as the faulty branch has been opened (line mp opened). Effectively, an impedance, which is negative to the impedance of line pm, may be added between junction m and p. Then the impedance matrix (noted as $Z_{NC}$) of modified network may be determined using EQUATION 13.

$$Z_{NC}(i, j) = \quad \text{(Equation 13)}$$
$$Z_N(i, j) - \frac{[Z_N(i, m) - Z_N(i, p)][Z_N(m, j) - Z_N(p, j)]}{Z_N(m, m) + Z_N(p, p) - 2Z_N(m, p) - Z_{mp}}$$

In EQUATION 13, $Z_N(i,j)$ is the element of ith row and jth column of original impedance matrix; Zmp is the impedance of link branch mp. The transfer impedance between m and n at the status of fault been cleared is the element of mth row and nth column of modified impedance matrix $Z_{NC}$, $Z_{mnC} = Z_{NC}(m, n)$.

Controller 102 may further determine the voltage phasors of bus m and n after the fault on mp has been cleared. Initially the virtue current $I_{pm}$ may be determined using EQUATION 14.

$$I_{pm} = \frac{U_p - U_m}{Z_N(m, p) - Z_{mp}} \quad \text{(Equation 14)}$$

The voltage phasors of m and n can be subsequently obtained by EQUATIONS 15 and 16, based on superposition.

$$U_{mC} = U_m + Z_N(m, m)I_{pm} - Z_N(m, p)I_{pm} = \quad \text{(Equation 15)}$$
$$U_m + \frac{[Z_N(m, m) - Z_N(m, p)]}{[Z_N(m, p) - Z_{mp}]}(U_p - U_m)$$

-continued
$$U_{nC} = U_n + Z_N(m, n)I_{pm} - Z_N(n, p)I_{pm} = \quad \text{(Equation 16)}$$
$$U_m + \frac{[Z_N(m, n) - Z_N(n, p)]}{[Z_N(m, p) - Z_{mp}]}(U_p - U_m)$$

The power of branch mn at status of fault on mp has been cleared, using EQUATION 17.

$$P_{M3} = \frac{U_{mC}U_{nC}}{X_{mnC}} \quad \text{(Equation 17)}$$

Controller 102 may further determine the angle of the instance that the fault was cleared, $\delta_{CR}$. Assuming that the clearing time is Tc=200 ms (or another predetermined time), Eular's method may be used for calculating the fault-clearance-angle. Set a time interval for calculating the angle, for example, $\Delta t = 1$ ms; and use EQUATION 18 to set initial value.

$$\begin{bmatrix} \delta(0) \\ \omega(0) \end{bmatrix} = \begin{bmatrix} \delta_{mn0} \\ \omega_0 \end{bmatrix} \quad \text{(Equation 18)}$$

The next time steps are determined by a time-incursive EQUATION 19.

$$\begin{bmatrix} \delta(n+1) \\ \omega(n+1) \end{bmatrix} = \begin{bmatrix} \delta(n) \\ \omega(n) \end{bmatrix} + \begin{bmatrix} \omega(n) - \omega_0 \\ P_0 - P_{M2}\sin\delta(n) \end{bmatrix}\Delta t \quad \text{(Equation 19)}$$

In EQUATION 19, $$P_0 = \frac{U_m U_n}{X_{mn}} \sin\delta_{mn0},$$

is the transmission power in line mn. The process is repeated, until the time goes to 200 ms. Then, the fault-clearance-angle can be obtained as $\delta_{CR} = \delta(200)$.

Controller 102 may calculate the dynamic rating power for angular stability based on equal area criterion, by solving EQUATION 20.

$$\int_{\delta_{0maxi}}^{\delta_{CR}}(P_{maxi} - P_{M2}\sin\delta)d\delta = \quad \text{(Equation 20)}$$
$$\int_{\delta_{CR}}^{\frac{\pi}{2}-\delta_{0maxi}}(P_{M3}\sin\delta - P_{maxi})d\delta$$

The equation can be simplified as follows (as we have known that $P_{maxi} = P_{M1}\sin\delta_{0maxi}$), into EQUATION 21.

$$-2P_{M1}\delta_{0maxi}\sin\delta_{0maxi} - P_{M2}\cos\delta_{0maxi} + P_{M3}\sin\delta_{0maxi} = (P_{M3} - P_{M2})\cos\delta_{CR} \quad \text{(Equation 21)}$$

EQUATION 21 is an equation with respect to the only unknown variable $\delta_{0maxi}$. Newton's method, or some other iterative method, may be used to solve $\delta_{0maxi}$, and then the maximum rating power for angular stability can be obtained EQUATION 22.

$$P_{maxi} = P_{M1}\sin\delta_{0maxi} \quad \text{(Equation 22)}$$

The controller 102 may be further configured to determine, based on the voltage phasors and the current phasors of nodes 108, a dynamic voltage stability power rating for each bus or node of the nodes 108. In embodiments, the controller 102 is configured to determine the dynamic voltage stability power rating by determining a Thevenin's circuit that is equivalent to the network 106.

FIG. 11 is a block diagram showing an equivalent Thevenin's circuit for a node 'n' of the power grid 104 of FIG. 1 for determining a dynamic voltage stability power rating. FIG. 12 is a block diagram showing a scheme for determining a dynamic voltage stability power rating based on the Thevenin's circuit of FIG. 11.

Controller 102 may initially determine an equivalent Thevenin's circuit at each bus or node, for example, bus n, and calculate the source impedance ($Z_{eq}$) and source voltage ($E_{eq}$) by using the impedance matrix of the network ($Z_N$) and using the measured voltage and current at the bus (for example, bus n in FIG. 11).

Controller 102 may determine, based on the calculated $E_{eq}$ and $Z_{eq}$ (in above step) and he measured reactive power $Q_{LD}$ at bus n, the maximum injecting power (dynamic power rating for voltage stability, which is the maximum power that can be injected to the bus to keep the voltage no being collapse) into bus n. The scheme of FIGS. 13 to 15 may be used.

FIG. 13 is a chart showing the crossing of example reactive power curves with a consumption reactive power curve for determining maximum active power. FIG. 14 is a chart showing the relationship between active power and voltage, and the maximum active power at marginal point of voltage stability. FIG. 15 is a chart showing the determination of maximum active power based on reactive power curves.

As seen in FIGS. 13 and 14, a generation reactive power curve having two cross point with consumption reactive power curve, represents voltage stability. A single cross point is on the margin edge of the voltage stability. Therefore the maximum active power P is at the point where there is only one cross point. As seen in FIG. 15, the top point (where the only cross point it may cross with load consumption curve) is at the point, $$Q_{LD} = \left(\frac{E \cos \delta}{X}\right)^2.$$

Accordingly, the maximum injection active power which can keep the voltage stability of bus n can be calculated by EQUATION 23.

$$P_{DynInjectMax} = \frac{E_{eq}V_{min}}{X_{eq}} \sin \delta = \quad \text{(Equation 23)}$$

$$\frac{E_{eq}^2 \cos \delta \sin \delta}{2X_{eq}^2} = \frac{E_{eq}^2}{4X_{eq}^2} \sin(2\delta) = \frac{1}{2}\sqrt{\frac{E_{eq}^2 Q_{LD}}{X_{eq}^2} - Q_{LD}^2}$$

The load impedance of all the other buses except bus n may be added into the impedance matrix of the grid network $Z_N$ form a new impedance matrix $Z_{Nnew}$ of the overall system except load (or generation) connected on bus n. For example, if at bus p, there is a load impedance $Z_{LDp}$, then the renewed impedance matrix is determined using EQUATION 24.

$$Z_{Nnew}(i, j) = Z_N(i, j) - \frac{Z_N(i, p)Z_N(p, j)}{Z_N(m, m) + Z_{LDp}} \quad \text{(Equation 24)}$$

The source impedance of the network at node n is the nth row and nth column of the renewed impedance matrix. That is, $Z_{eq} = Z_{Nnew}(n, n)$ The source impedance can be determined by measured voltage $U_n$ and the overall outgoing current $I_n$: $E_{eq} = U_n + Z_{eq}I_n$.

The consuming reactive power may be determined using EQUATION 25, φ being the angle difference between the voltage and current phasors.

$$Q_{LD} = U_n I_n \sin \varphi \quad \text{(Equation 25)}$$

The dynamic power rating may be determined using EQUATION 26.

$$P_{DynInjectMax} = \frac{E_{eq}V_{min}}{X_{eq}} \sin \delta = \quad \text{(Equation 26)}$$

$$\frac{E_{eq}^2 \cos \delta \sin \delta}{2X_{eq}^2} = \frac{E_{eq}^2}{4X_{eq}^2} \sin(2\delta) = \frac{1}{2}\sqrt{\frac{E_{eq}^2 Q_{LD}}{X_{eq}^2} - Q_{LD}^2}$$

Thus, controller 102 may thus be configured to determine each of the dynamic thermal stability power rating, the dynamic angular stability power rating, and the dynamic voltage stability power rating. The controller 102 may further control the power grid 104 in response to these parameters. For example, the controller 102 may be further configured to determine, based on the dynamic thermal stability power rating, the dynamic angular stability power rating, and the dynamic voltage stability power rating, a dynamic system rating for the power grid 104. The controller 102 may be further configured to control the power grid 104 in response to the dynamic system rating.

FIG. 16 is a block diagram showing the controller of FIG. 1 controlling the power grid to increase power transmission from a renewable energy source while reducing power transmission loss. As an example, using the scheme of FIG. 16, the following optimization may be performed, with the "Objective" of maximizing renewable output and minimizing the overall power loss, for example, being represented by EQUATION 27, and subject to constraints according to restrain equations of EQUATIONS 28 and 29, and restrain inequations of EQUATIONS 30 to 32.

$$\max\{\Sigma P_{injectRenew} - \gamma \Delta P_\Sigma\} \quad \text{(Equation 27)}$$

$$\Delta P_i = P_{si} - V_i \Sigma_{k=1}^N V_k (G_{ik} \cos \delta_{ik} + B_{ik} \sin \delta_{ik}) = 0 \quad \text{(Equation 28)}$$

$$\Delta Q_i = Q_{si} - V_i \Sigma_{k=1}^N V_k (B_{ik} \cos \delta_{ik} - G_{ik} \sin \delta_{ik}) = 0 \quad \text{(Equation 29)}$$

$$P_{Tij} < P_{DSRAng,ThermMaxi} \quad \text{(Equation 30)}$$

$$P_{inject,j} < P_{DSRVolMaxi} \quad \text{(Equation 31)}$$

$$V_{imin} < V < V_{imax} \quad \text{(Equation 32)}$$

The output of the optimization may include (1) tap-changer position of each transformer, ($k_{Tap}$); (2) the injection reactive power of each bus ($Q_{inject}$); and (3) injection active power of each bus ($P_{inject}$).

In embodiments, the controller 102 is further configured to control the power grid 104 in response to the dynamic system rating by increasing a power drawn from at least one renewable power source associated with a node of the nodes 108. In embodiments, the controller 102 is further configured to optimally control the power grid 104 in response to the dynamic system rating by maximizing a power drawn from at least one renewable power source associated with a node of the nodes 108. In embodiments, the controller 102 is configured to control the power grid 104 in response to the dynamic system rating by reducing a power loss of the network 106. In embodiments, the controller 102 is configured to optimally control the power grid 104 in response to the dynamic system rating by minimizing a power loss of the network 106. Reducing the power loss of the network 106 may include reducing at least one of a line power loss or a node power loss.

In embodiments, the present disclosure describes a method for dynamic rating of a power grid including a network of nodes coupled by lines. The method may include sending, to a controller, signals from terminal units indicative of voltage phasors and current phasors at each node of the nodes. At least one node of the nodes may be associated with a renewable power source.

The method may further include determining, by the controller, based on the voltage phasors and the current phasors of nodes, a dynamic thermal stability power rating for each line of the lines. In embodiments, the determining, by the controller, the dynamic thermal stability power rating for each line of the lines is not based on environmental parameters.

The method may further include determining, by the controller, based on the voltage phasors and the current phasors of nodes, a dynamic angular stability power rating for each node of the nodes. The determining, by the controller, the dynamic angular stability power rating may include simulating, by the controller, assuming an applied fault and clearing the fault at an adjacent branch.

The method may further include determining, by the controller, based on the voltage phasors and the current phasors of nodes, a dynamic voltage stability power rating for each node of the nodes. The determining, by the controller, the dynamic voltage stability power rating may include determining, by the controller, a Thevenin's circuit that is equivalent to the network.

The method may further include determining, by the controller, based on the dynamic thermal stability power rating, the dynamic angular stability power rating, and the dynamic voltage stability power rating, a dynamic system rating for the power grid.

The method may further include controlling, by the controller, the power grid in response to the dynamic system rating. The controlling, by the controller, the power grid may include increasing a power drawn from the renewable power source. The controlling, by the controller, the power grid may include maximizing a power drawn from the renewable power source. The controlling, by the controller, the power grid may include reducing a power loss of the network. The reducing, by the controller, the power loss of the network may include reducing a line power loss or a node power loss. The controlling, by the controller, the power grid may include increasing a ratio of power transmission to a static power rating of at least one line of the lines to greater than 1:1.

Thus, systems and methods according to the present disclosure may be used to control or regulate a power grid based on a dynamic system rating. Certain advantages of the present systems and methods may include drawing more power from renewable sources, which could significantly reduce the emission of $CO_2$ about 10-15%, increase the revenue of power generation by 10-15% (for example, saving non-renewable fuel use for power generation). Further advantages may include maintaining thermal, angular, and voltage stability, while increasing the ceiling of the transmission capacity dynamically (accounting for thermal stability, angular stability, and voltage stability). The transmission power may be increased compared to a power grid governed based on a static rating of power capacity. Optimizing power flow based on the dynamic power rating, may reduce or minimize the power loss during power transmission, which may can reduce operation costs by 1-3% associated with transmission loss. The present systems and methods may also increase the observability of power grids. For example, the dynamic margin of thermal, angular and voltage stability may be observed in real-time or near real-time.

We claim:

1. A system for dynamic rating of a power grid comprising a network of a plurality of nodes coupled by a plurality of lines, the system comprising:
   a plurality of terminal units, each terminal unit of the plurality of terminal units being configured to detect a voltage phasor and a current phasor at a respective node of the plurality of nodes and generate signals indicative of the voltage phasor and the current phasor; and
   a controller configured to:
      receive signals from the plurality of terminal units indicative of the voltage phasors and the current phasors of the plurality of nodes,
      determine, based on the voltage phasors and the current phasors of the plurality of nodes, a dynamic thermal stability power rating for each line of the plurality of lines, wherein the dynamic thermal stability power rating is indicative of a maximum rating current and a maximum conductor temperature supported by each line,
      determine, based on the voltage phasors and the current phasors of the plurality of nodes, a dynamic angular stability power rating for each node of the plurality of nodes, wherein the dynamic angular stability power rating is indicative of a maximum transmission power corresponding to an angular stability margin for each node,
      determine, based on the voltage phasors and the current phasors of the plurality of nodes, a dynamic voltage stability power rating for each node of the plurality of nodes,
      determine, based on the dynamic thermal stability power rating, the dynamic angular stability power rating, and the dynamic voltage stability power rating, a dynamic system rating for the power grid, and
      control the power grid in response to the dynamic system rating.

2. The system of claim 1, wherein the terminal unit comprises a synchronous phasor measurement unit (PMU), a remote terminal unit (RTU), a feeder terminal unit (FTU), a zonal client, or a zonal agent.

3. The system of claim 1, wherein the controller comprises a power gateway or a server.

4. The system of claim 1, wherein at least one node of the plurality of nodes is associated with a renewable power source.

5. The system of claim 4, wherein the controller is configured to optimally control the power grid in response to the dynamic system rating by maximizing a power drawn from the renewable power source.

6. The system of claim 1, wherein the controller is configured to optimally control the power grid in response to the dynamic system rating by minimizing a power loss of the network.

7. The system of claim 1, wherein the controller is configured to control the power grid in response to the dynamic system rating by reducing at least one of a line power loss or a node power loss.

8. The system of claim 1, wherein the controller is configured to determine the dynamic angular stability power rating by assuming an applied fault and clearing the fault at an adjacent branch.

9. The system of claim 1, wherein the controller is configured to determine the dynamic voltage stability power rating by determining a Thevenin's circuit that is equivalent to the network.

10. The system of claim 1, wherein the controller is configured to determine the dynamic thermal stability power rating for each line of the plurality of lines without assessing environmental parameters.

11. A method for dynamic rating of a power grid comprising a plurality of nodes coupled by a plurality of lines, the method comprising:
sending, to a controller, signals from a plurality of terminal units indicative of voltage phasors and current phasors at each node of the plurality of nodes,
determining, by the controller, based on the voltage phasors and the current phasors of the plurality of nodes, a dynamic thermal stability power rating for each line of the plurality of lines, wherein the dynamic thermal stability power rating is indicative of a maximum rating current and a maximum conductor temperature supported by each line,
determining, by the controller, based on the voltage phasors and the current phasors of the plurality of nodes, a dynamic angular stability power rating for each node, wherein the dynamic angular stability power rating is indicative of a maximum transmission power corresponding to an angular stability margin for each node,
determining, by the controller, based on the voltage phasors and the current phasors of the plurality of nodes, a dynamic voltage stability power rating for each node of the plurality of nodes,
determining, by the controller, based on the dynamic thermal stability power rating, the dynamic angular stability power rating, and the dynamic voltage stability power rating, a dynamic system rating for the power grid, and
controlling, by the controller, the power grid in response to the dynamic system rating.

12. The method of claim 11, wherein at least one node of the plurality of nodes is associated with a renewable power source.

13. The method of claim 12, wherein the controlling, by the controller, the power grid comprises increasing a power drawn from the renewable power source.

14. The method of claim 12, wherein the controlling, by the controller, the power grid comprises maximizing a power drawn from the renewable power source.

15. The method of claim 11, wherein the controlling, by the controller, the power grid comprises reducing a power loss of the power grid.

16. The method of claim 11, wherein the controlling, by the controller, the power grid comprises minimizing a power loss of the power grid.

17. The method of claim 11, wherein the determining, by the controller, the dynamic angular stability power rating comprises simulating, by the controller, applying a fault and clearing the fault at an adjacent branch.

18. The method of claim 11, wherein the determining, by the controller, the dynamic voltage stability power rating comprises determining, by the controller, a Thevenin's circuit that is equivalent to the power grid.

19. The method of claim 11, wherein the determining, by the controller, the dynamic thermal stability power rating for each line of the plurality of lines is not based on environmental parameters.

20. The method of claim 11, wherein the controlling, by the controller, the power grid comprises increasing a ratio of power transmission to a static power rating of at least one line of the plurality of lines to greater than 1.

* * * * *